(12) United States Patent
Kawano

(10) Patent No.: US 11,091,075 B2
(45) Date of Patent: Aug. 17, 2021

(54) SEAT AIR CONDITIONER

(71) Applicant: DENSO CORPORATION, Kariya (JP)

(72) Inventor: Shigeru Kawano, Kariya (JP)

(73) Assignee: DENSO CORPORATION, Kariya (JP)

( * ) Notice: Subject to any disclaimer, the term of this patent is extended or adjusted under 35 U.S.C. 154(b) by 63 days.

(21) Appl. No.: 16/439,890

(22) Filed: Jun. 13, 2019

(65) Prior Publication Data

US 2019/0291614 A1 Sep. 26, 2019

Related U.S. Application Data

(63) Continuation of application No. PCT/JP2017/044462, filed on Dec. 12, 2017.

(30) Foreign Application Priority Data

Jan. 24, 2017 (JP) .............................. JP2017-010520

(51) Int. Cl.
*B60N 2/56* (2006.01)
*B60H 1/32* (2006.01)
*B60H 1/00* (2006.01)
*A47C 7/74* (2006.01)

(52) U.S. Cl.
CPC .............. *B60N 2/5678* (2013.01); *A47C 7/74* (2013.01); *B60H 1/00* (2013.01); *B60H 1/32* (2013.01); *B60N 2/5635* (2013.01); *B60N 2/5657* (2013.01)

(58) Field of Classification Search
CPC .. B60N 2/5678; B60N 2/5635; B60N 2/5657; B60H 1/32; B60H 1/00; B60H 1/005; B60H 1/00285; A47C 7/74
See application file for complete search history.

(56) References Cited

U.S. PATENT DOCUMENTS

| | | | | |
|---|---|---|---|---|
| 5,450,894 A | * | 9/1995 | Inoue ................. | B60H 1/00664 165/43 |
| 5,921,100 A | * | 7/1999 | Yoshinori .......... | B60H 1/00285 165/43 |
| 6,003,950 A | | 12/1999 | Larsson | |
| 6,105,667 A | * | 8/2000 | Yoshinori .......... | B60H 1/00285 165/202 |

(Continued)

FOREIGN PATENT DOCUMENTS

| | | |
|---|---|---|
| JP | S53044841 U | 4/1978 |
| JP | H05286346 A | 11/1993 |

(Continued)

*Primary Examiner* — Emmanuel E Duke
(74) *Attorney, Agent, or Firm* — Harness, Dickey & Pierce, P.L.C.

(57) ABSTRACT

A seat air conditioner includes a housing disposed in a space formed below a seating portion of a seat and above a cabin floor surface inside a cabin. The housing houses: a compressor that compresses and discharges a refrigerant; a condenser that dissipates heat from the refrigerant discharged from the compressor; a decompressor that decompresses the refrigerant flowing out of the condenser; an evaporator that evaporates the refrigerant decompressed by the decompressor; and an air blower that blows air to be heat-exchanged with the refrigerant. The air blower is capable of drawing the air through a ventilation opening formed on an upper face of the housing.

6 Claims, 8 Drawing Sheets

(56) References Cited

U.S. PATENT DOCUMENTS

| | | | |
|---|---|---|---|
| 2009/0193827 A1* | 8/2009 | Lee | B60H 1/00285 62/190 |
| 2012/0013153 A1* | 1/2012 | Chang | B60N 2/565 297/180.1 |
| 2013/0145792 A1* | 6/2013 | Toyama | B60H 1/00207 62/498 |
| 2013/0165033 A1* | 6/2013 | Fitzpatrick | B60N 2/5692 454/120 |

FOREIGN PATENT DOCUMENTS

| | | |
|---|---|---|
| JP | 2000504236 A | 4/2000 |
| JP | 2016145015 A | 8/2016 |

* cited by examiner

SEAT AIR CONDITIONER

CROSS REFERENCE TO RELATED APPLICATIONS

The present application is a continuation application of International Patent Application No. PCT/JP2017/044462 filed on Dec. 12, 2017, which designated the United States and claims the benefit of priority from Japanese Patent Application No. 2017-010520 filed on Jan. 24, 2017. The entire disclosures of all of the above applications are incorporated herein by reference.

TECHNICAL FIELD

The present disclosure relates to a seat air conditioner that supplies conditioned air to a seat.

BACKGROUND ART

Various seat air conditioners have been developed in order to provide an occupant seated on a seat with a comfortable temperature environment.

SUMMARY

According to an aspect of the present disclosure, a seat air conditioner includes:

a housing disposed in a space formed below a seating portion of a seat and above a cabin floor surface inside a cabin;

a compressor that compresses and discharges a refrigerant;

a condenser that dissipates heat from the refrigerant discharged from the compressor;

a decompressor that decompresses the refrigerant flowing out of the condenser;

an evaporator that evaporates the refrigerant decompressed by the decompressor; and an air blower that blows air to be heat-exchanged with the refrigerant.

The compressor, the condenser, the decompressor, the evaporator, and the air blower are housed in the housing, and the air blower is capable of drawing air through a ventilation opening formed on an upper face of the housing.

DESCRIPTION OF EMBODIMENTS

Figure 1:
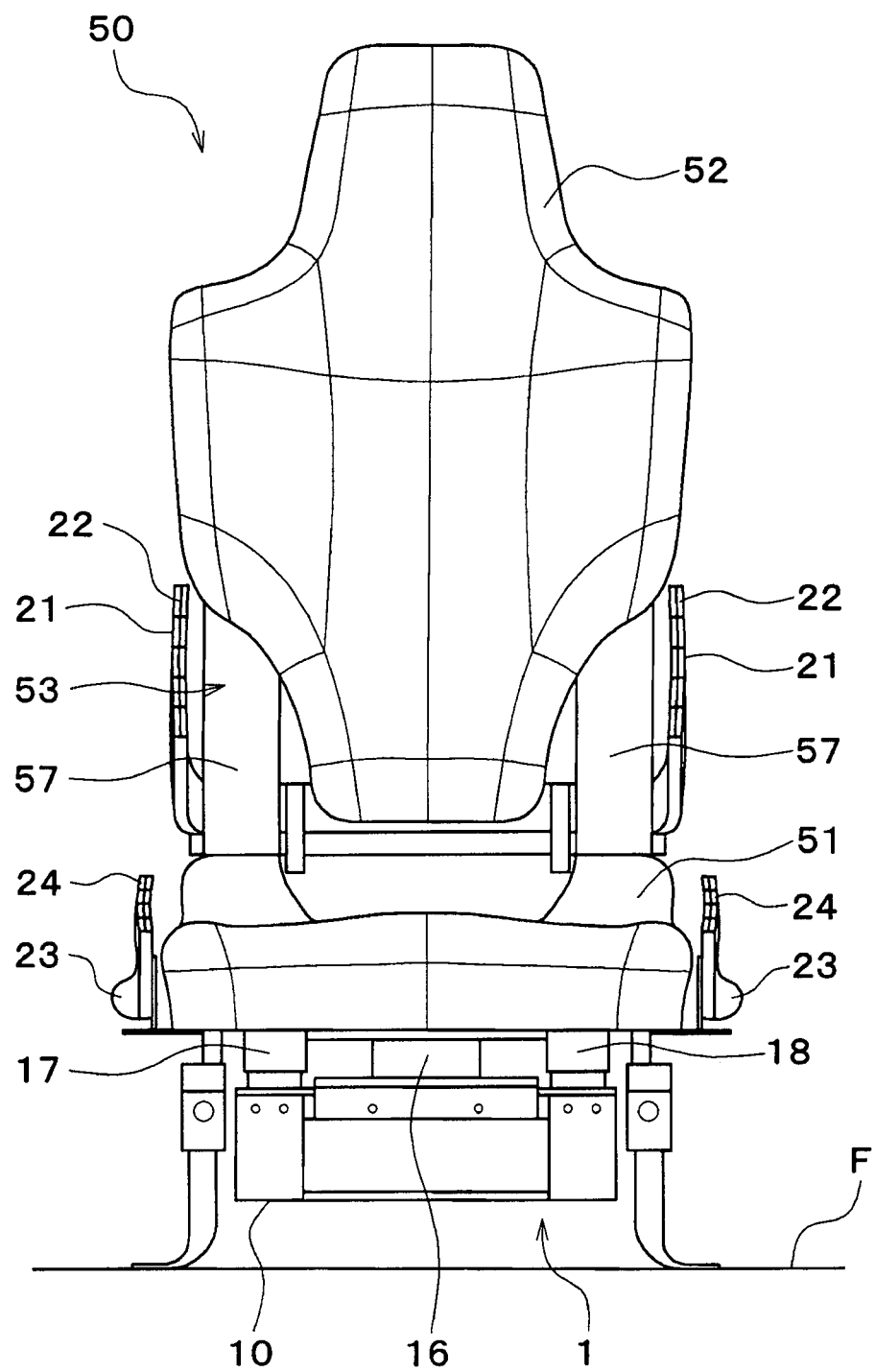
FIG. 1 is a front view of a seat air conditioner according to a first embodiment.

A seat air conditioner is disposed between a seating portion of a seat and a floor, and includes a vapor compression refrigeration cycle inside a housing. The seat air conditioner blows conditioned air temperature-controlled by the refrigeration cycle to the seat to improve the comfort of an occupant seated on the seat.

In the seat air conditioner, in order to blow conditioned air, it is necessary to draw air to be temperature-controlled by the refrigeration cycle. In a seat air conditioner, an air inlet port may be formed on the lower face of the housing of the seat air conditioner and disposed facing a floor surface.

In the configuration, since the inlet port is formed on the lower face of the housing of the seat air conditioner and thus faces the floor surface, air near the floor surface is drawn through the inlet port, and the air may be heated by, for example, solar radiation. In this case, a rise in the temperature of drawn air increases the temperature of air blown to the occupant after cooling by the refrigeration cycle, which reduces the cooling performance in the seat air conditioner.

Further, in the above configuration, when air is drawn through the inlet port, dirt or dust on the floor surface may be drawn together with the air. The drawn dust or the like may be accumulated inside the seat air conditioner and inhibit heat exchange in the refrigeration cycle, which considerably reduces the air conditioning performance of the seat air conditioner.

The present disclosure provides a seat air conditioner disposed below a seating portion of a seat, capable of preventing a reduction in air conditioning performance relating to air drawing.

According to an aspect of the present disclosure, a seat air conditioner includes:

a housing disposed in a space formed below a seating portion of a seat and above a cabin floor surface inside a cabin;

a compressor that compresses and discharges a refrigerant;

a condenser that dissipates heat from the refrigerant discharged from the compressor;

a decompressor that decompresses the refrigerant flowing out of the condenser;

an evaporator that evaporates the refrigerant decompressed by the decompressor; and an air blower that blows air to be heat-exchanged with the refrigerant.

The compressor, the condenser, the decompressor, the evaporator, and the air blower are housed in the housing, and the air blower is capable of drawing air through a ventilation opening formed on an upper face of the housing.

Accordingly, the seat air conditioner is capable of drawing air above the upper face of the housing which is away from the cabin floor surface and sending out conditioned air when the air blower is operated in an air conditioning operation. That is, the seat air conditioner makes it possible to reduce the drawing of air near the cabin floor surface, the air being heated by, for example, solar radiation, and prevent a reduction in cooling performance in the seat air conditioner.

Further, in the drawing of air along with the operation of the air blower, the drawing of dust or the like from the cabin floor surface can be reduced. Thus, the seat air conditioner makes it possible to prevent a reduction in air conditioning performance of the refrigeration cycle caused by accumulation of dust or the like and prevent a failure caused by dust or the like.

Hereinafter, embodiments will be described according to the drawings. Same or equivalent portions among respective embodiments below are labeled with same reference numerals in the drawings.

First Embodiment

Figure 2:
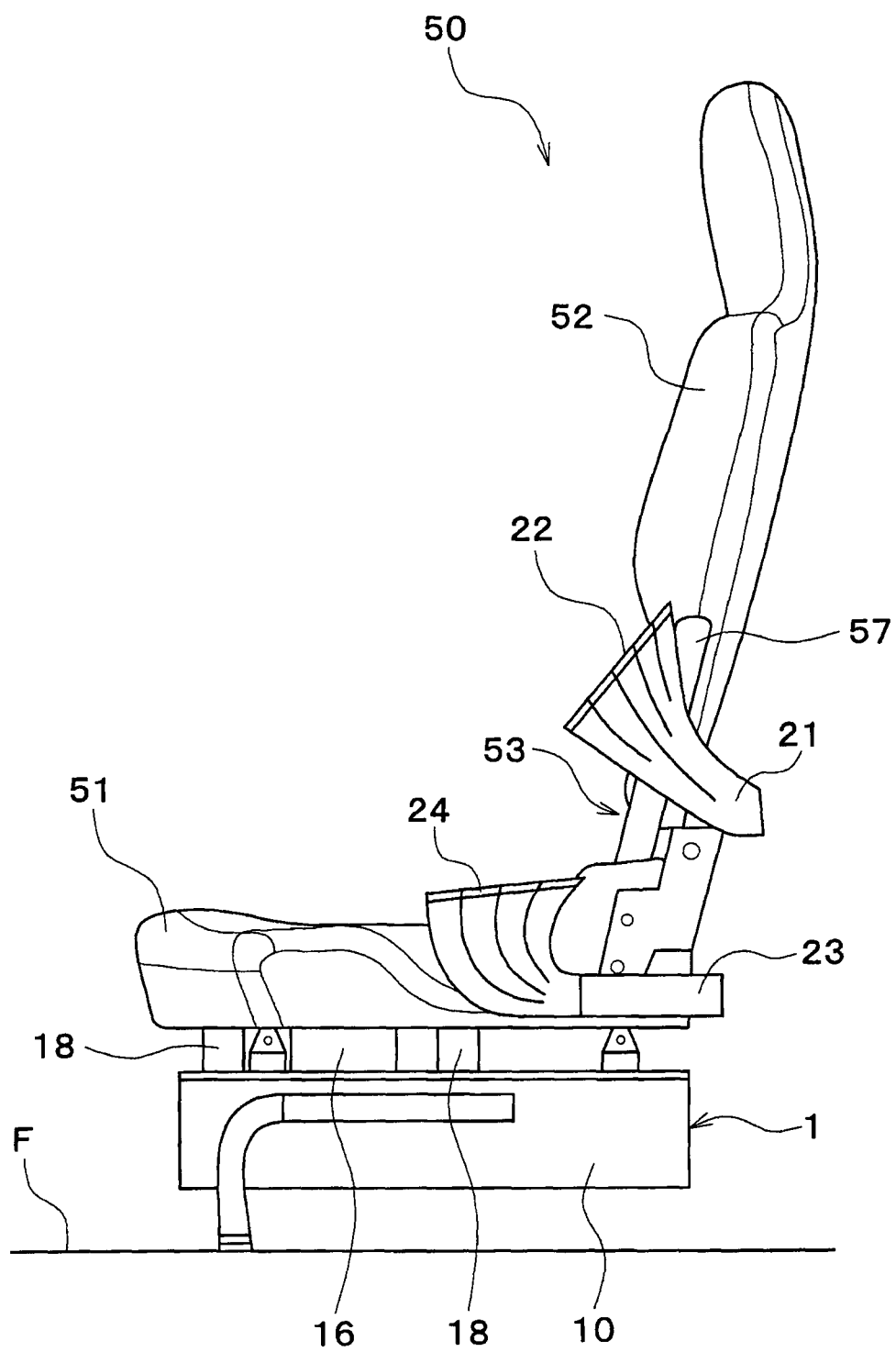
FIG. 2 is a side view of the seat air conditioner according to the first embodiment.

A seat air conditioner 1 according to the first embodiment is applied to air conditioning of an electric vehicle which travels by power of a battery. As illustrated in FIGS. 1 and 2, the seat air conditioner 1 is disposed in a small space between a seating portion 51 of a seat 50 of the electric vehicle and a cabin floor surface F, and improves the comfort of an occupant seated on the seat 50 by creating an air flow A by temperature-controlled air.

The seat air conditioner 1 includes a housing 10, and a vapor compression refrigeration cycle 2 and an air blower 7 which are housed in the housing 10. Thus, the seat air conditioner 1 is capable of controlling the temperature of ventilation air blown by the operation of the air blower 7 by the refrigeration cycle 2 and supplying the temperature-controlled ventilation air as conditioned air to the occupant seated on the seat 50 through the seat 50, a main duct 21, and a leg duct 23.

The seat 50 includes the seating portion 51 and a backrest part 52. The seat 50 is disposed slidably in the front-rear direction of the vehicle with respect to the cabin floor surface F of the vehicle. The seat air conditioner 1 is fixed to the lower face of the seating portion 51 and slidable together with the seat 50. The seat air conditioner 1 receives power supplied from an onboard battery. A power line from the onboard battery includes coil wiring having an allowance so as to allow the seat 50 to slide.

A schematic configuration of the seat air conditioner 1 according to the first embodiment will be described in detail with reference to FIGS. 3 and 4. As described above, the seat air conditioner 1 according to the first embodiment is disposed between the seating portion 51 of the seat 50 and the cabin floor surface F.

Figure 3:
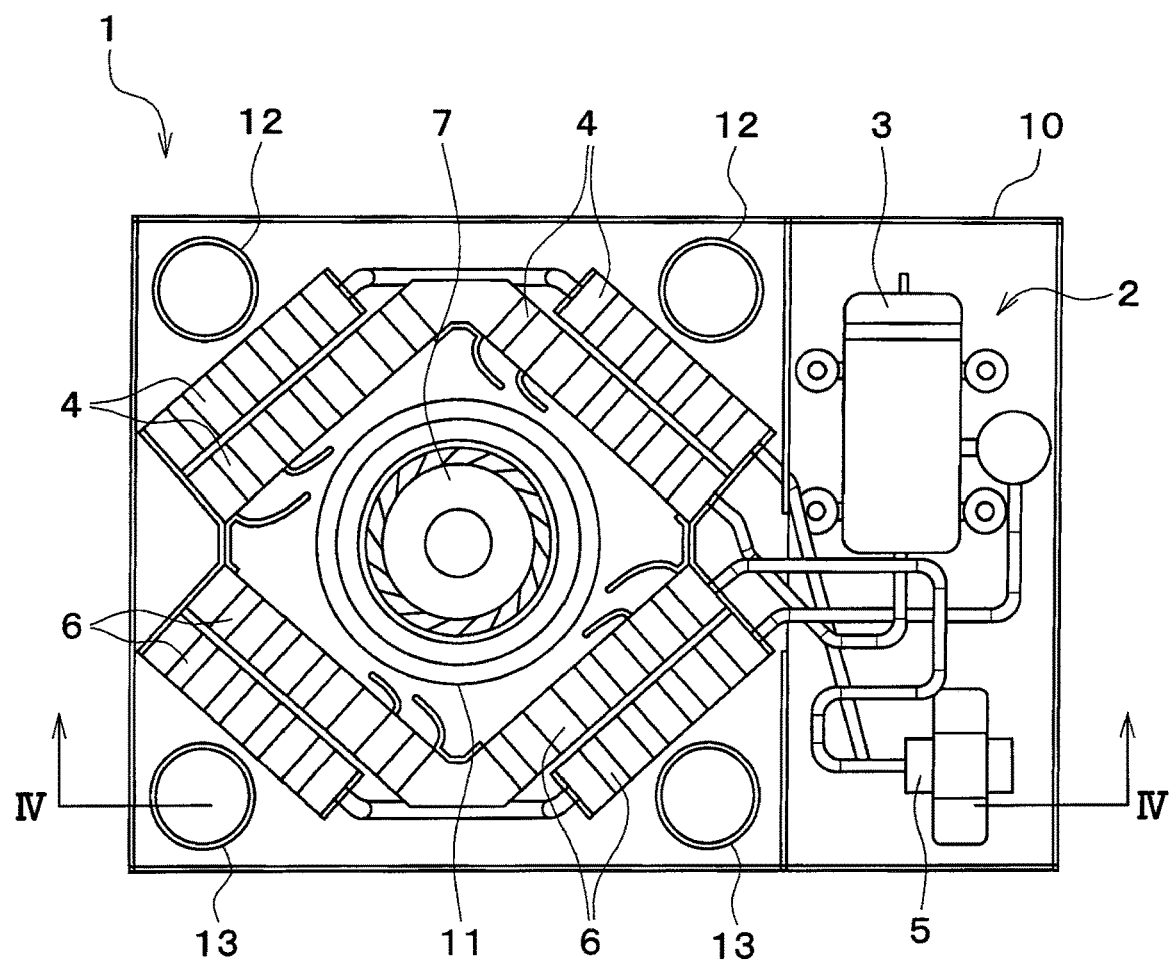
FIG. 3 is a plan view illustrating a schematic configuration of the seat air conditioner according to the first embodiment.
Figure 4:
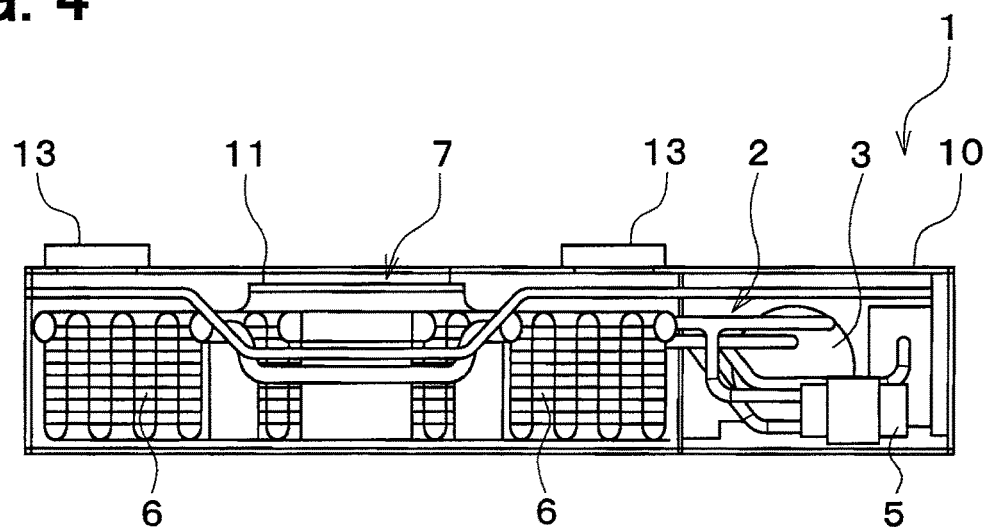
FIG. 4 is a sectional view taken along line IV-IV in FIG. 3.

As illustrated in FIGS. 3 and 4, in the seat air conditioner 1, the refrigeration cycle 2 and the air blower 7 are housed inside the housing 10 configured as a box which can be disposed between the seating portion 51 and the cabin floor surface F.

The refrigeration cycle 2 constitutes a vapor compression refrigeration cycle and has a function of cooling or heating ventilation air blown to an area around the seat 50 inside a cabin which is a space to be air-conditioned. The refrigeration cycle 2 includes a compressor 3, a condenser 4, an expansion valve 5, and an evaporator 6.

The refrigeration cycle 2 employs an HFC refrigerant (specifically, R134a) as a refrigerant and constitutes a vapor compression subcritical refrigeration cycle in which the high-pressure side refrigerant pressure does not exceed the critical pressure of the refrigerant. An HFO refrigerant (e.g., R1234yf) or a natural refrigerant (e.g., R744) may be employed as the refrigerant. Further, a refrigerating machine oil for lubricating the compressor 3 is mixed in the refrigerant. Part of the refrigerating machine oil circulates through the cycle together with the refrigerant.

As illustrated in FIG. 3, in the seat air conditioner 1, the air blower 7 is disposed at the central part inside the housing 10. The air blower 7 is an electric air blower which drives a centrifugal multi-blade fan by an electric motor. The air blower 7 is disposed with a rotation axis of the centrifugal multi-blade fan aligned with the up-down direction of the housing 10. Thus, the air blower 7 draws air along the up-down direction of the housing 10 and blows the drawn air in the direction perpendicular to the axis and in the centrifugal direction. A rotation speed (air blowing amount) of the centrifugal multi-blade fan in the air blower 7 is controlled by control voltage output from an air conditioning controller (not illustrated).

The compressor 3 sucks, compresses, and discharges the refrigerant in the refrigeration cycle 2. The compressor 3 is disposed inside the housing 10 of the seat air conditioner 1. The compressor 3 is configured as an electric compressor which drives a fixed displacement compression mechanism whose discharge capacity is fixed by an electric motor. Various compression mechanisms such as a scroll compression mechanism and a vane compression mechanism can be employed as the compression mechanism.

The operation (rotation speed) of the electric motor included in the compressor 3 is controlled by a control signal output from the air conditioning controller (not illustrated). Any of an AC motor and a DC motor may be employed as the electric motor. A refrigerant discharge capacity of the compression mechanism is changed by controlling the rotation speed of the electric motor by the air conditioning controller.

A refrigerant inlet side of the condenser 4 is connected to a discharge port of the compressor 3. As illustrated in FIG. 3, the condenser 4 includes a plurality of heat exchangers which are disposed in a manner to surround the air blower 7 over the range of approximately 180 degrees and connected through refrigerant pipes. Thus, the condenser 4 is capable of exchanging heat between the high-temperature and high-pressure refrigerant discharged from the compressor 3 and ventilation air blown by the air blower 7 to heat the ventilation air. That is, the condenser 4 functions as a heating heat exchanger.

The expansion valve 5 is disposed on a refrigerant outlet side of the condenser 4. The expansion valve 5 is capable of changing a throttle opening degree of a refrigerant passage, and decompresses the refrigerant flowing out of the condenser 4. The expansion valve 5 functions as a decompressor.

The expansion valve 5 is used as the decompressor according to the first embodiment. However, the present disclosure is not limited to this mode. Various configurations capable of decompressing the refrigerant flowing out of the condenser 4 can be employed as the decompressor. For example, a fixed throttle or a capillary tube may be employed as the decompressor, or an expansion valve capable of controlling a throttle opening degree by a control signal of the air conditioning controller may be used.

A refrigerant inlet side of the evaporator 6 is connected to an outlet side of the expansion valve 5. As illustrated in FIG. 3, the evaporator 6 includes a plurality of heat exchangers which are disposed in a manner to surround the air blower 7 over the range of approximately 180 degrees and connected through refrigerant pipes. That is, the air blower 7 is surrounded by the condenser 4 and the evaporator 6. Thus, the evaporator 6 is capable of exchanging heat between the refrigerant flowing out of the expansion valve 5 and ventilation air blown by the air blower 7 to cool the ventilation air. That is, the evaporator 6 functions as a cooling heat exchanger.

The housing 10 is formed in a box shape having a size that can be disposed in the space between the seating portion 51 of the seat 50 and the cabin floor surface F. The housing 10 includes a central ventilation opening 11, a plurality of first ventilation openings 12, and a plurality of second ventilation openings 13 on the upper face thereof.

As illustrated in FIGS. 3 and 4, the central ventilation opening 11 is formed at the central part of the upper face of the housing 10 and open in such a manner to include a part right above the rotation axis of the centrifugal multi-blade fan of the air blower 7. The central ventilation opening 11 allows the inside and the outside of the housing 10 to communicate with each other and functions as a ventilation opening. Thus, the air blower 7 is capable of drawing air inside the cabin into the housing 10 through the central ventilation opening 11 along with the operation thereof.

The first ventilation openings 12 are open on two corners of the upper face of the housing 10, the two corners being located adjacent to the condenser 4, and allow the inside and the outside of the housing 10 to communicate with each other. Part of ventilation air blown by the air blower 7 is heated by heat exchange in the condenser 4 and then blown out through the first ventilation openings 12. The first ventilation opening 12 is an example of a ventilation port.

The second ventilation openings 13 are open on two corners of the upper face of the housing 10, the two corners being located adjacent to the evaporator 6, and allow the inside and the outside of the housing 10 to communicate with each other. The rest part of the ventilation air blown by the air blower 7 is cooled by heat exchange in the evaporator 6 and then blown out through the second ventilation openings 13. The second ventilation opening 13 is also an example of a ventilation port.

In the first embodiment, a central connection member 16 is attached to the central ventilation opening 11. The central connection member 16 is formed in a hollow shape and connected to the lower face of the seating portion 51 of the seat 50.

The seating portion 51 of the seat 50 includes a cushion part which is made of a porous material such as urethane on the upper part thereof. The elasticity of the cushion part relieves a shock generated by contact with the occupant. The seating portion 51 has air permeability due to the cushion part made of the porous material.

Thus, the seat air conditioner 1 is capable of moving air between the seat air conditioner 1 and a space above the seating portion 51 having air permeability through the central ventilation opening 11 and the central connection member 16 and capable of drawing air from the space above the seating portion 51. That is, the central connection member 16 is an example of a connection member.

A first connection member 17 having a hollow shape is attached to each of the first ventilation openings 12. A second connection member 18 having a hollow shape is attached to each of the second ventilation openings 13. Each of the first connection member 17 and the second connection member 18 is connected to a conditioned air supply port 58 of a seat frame 53 (described below) and ends of the main duct 21 and the leg duct 23 (described below) through a conditioned air supply mechanism unit (not illustrated) which is disposed inside the seating portion 51.

Figure 6:
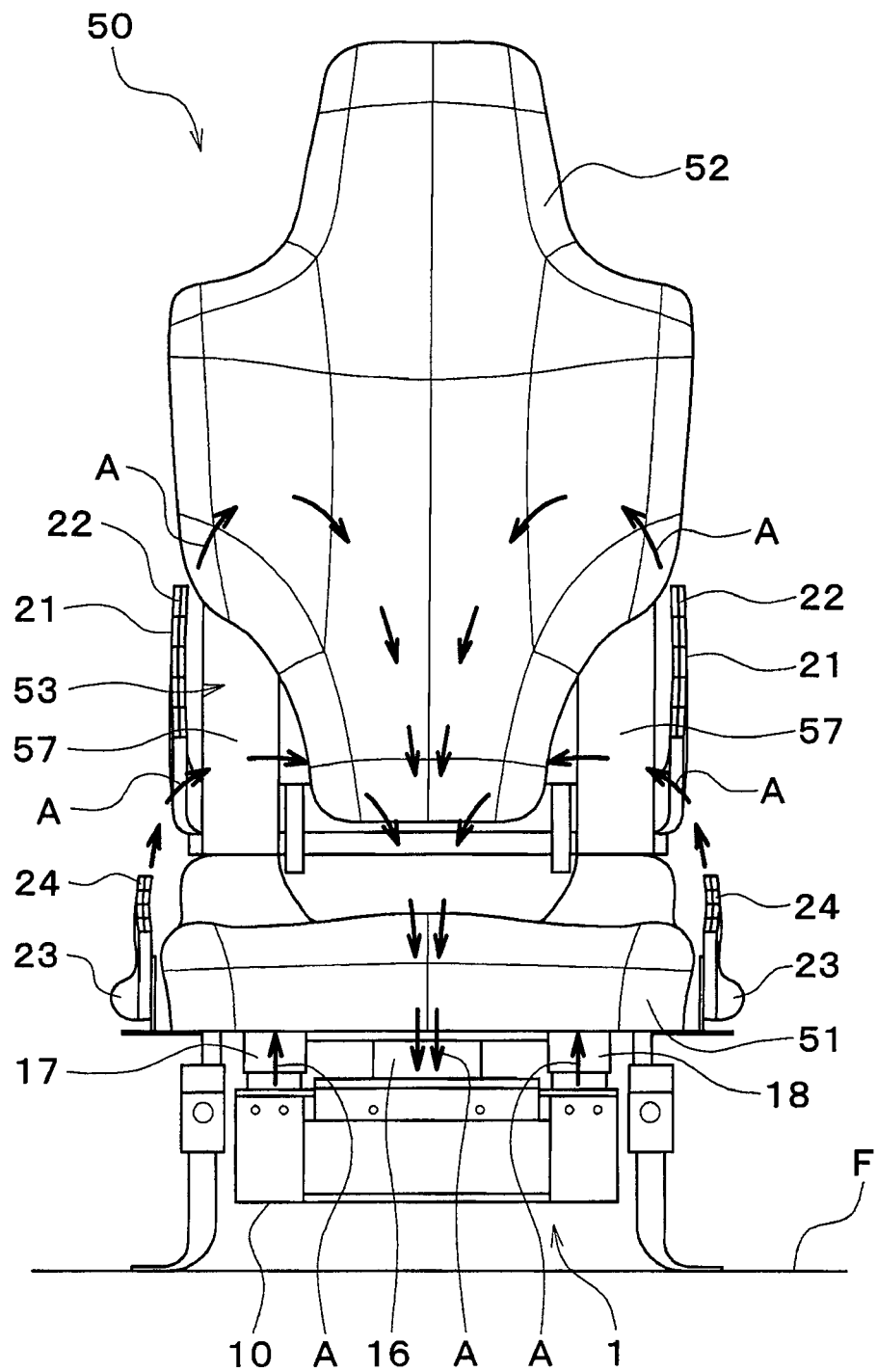
FIG. 6 is a front view illustrating an air flow created by the seat air conditioner according to the first embodiment.
Figure 7:
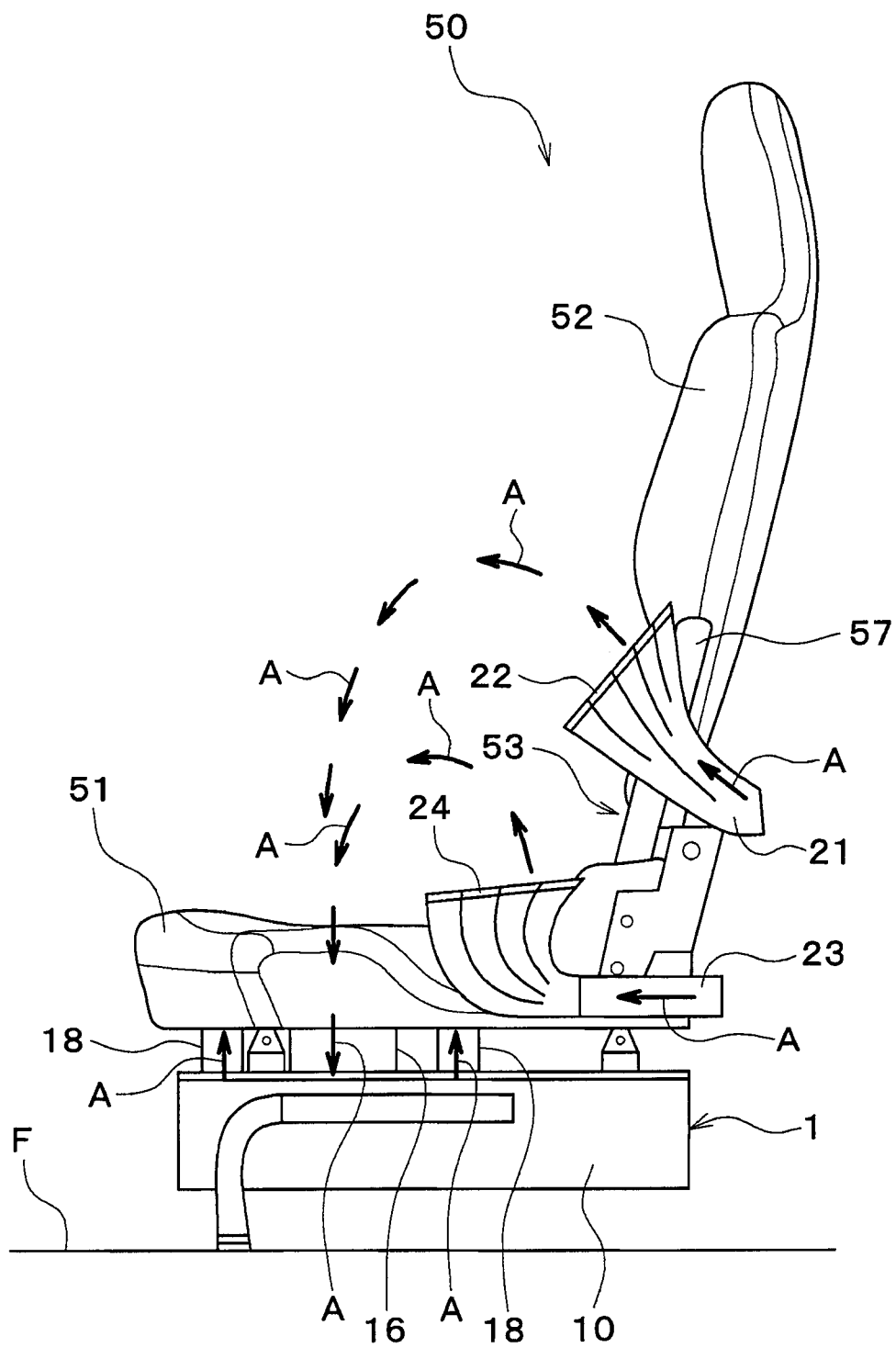
FIG. 7 is a side view illustrating the air flow created by the seat air conditioner according to the first embodiment.

Thus, as illustrated in FIGS. 6 and 7, the seat air conditioner 1 is capable of supplying conditioned air controlled by the refrigeration cycle 2 to the occupant seated on the seat 50 through each conditioned air blowoff port 59 of a second seat frame 57, a main ventilation hole 22 of the main duct 21, and a leg ventilation hole 24 of the leg duct 23. That is, the first connection member 17 and the second connection member 18 function as a part of a duct member and also function as a part of a tubular member.

As illustrated in FIGS. 1 and 2, each of the main duct 21 and the leg duct 23 is disposed on both side faces of the seat 50. The main duct 21 is formed in a hollow flat shape, and extends up to the middle of the backrest part 52 along the side face of the seat 50.

One end of the main duct 21 is located on the middle of the backrest part 52, and includes the main ventilation hole 22. The main ventilation hole 22 communicates with the inside of the main duct 21. The main ventilation hole 22 is formed in a shape slightly curved inward in the width direction at a position adjacent to the side face of the seat 50. The other end of the main duct 21 is connected to the first connection members 17 and the first ventilation openings 12, and the second connection members 18 and the second ventilation openings 13 through the conditioned air supply mechanism unit (not illustrated).

Thus, part of conditioned air controlled by the seat air conditioner 1 is supplied to the occupant seated on the seat 50 through the main ventilation hole 22. Since the main ventilation hole 22 is slightly curved inward in the width direction on the middle of the backrest part 52, the seat air conditioner 1 is capable of more efficiently supplying conditioned air to the trunk part of the occupant seated on the seat 50.

The leg duct 23 is formed in a hollow shape. The leg duct 23 extends along the side face of the seating portion 51 of the seat 50 and then bends upward. One end of the leg duct 23 is located slightly above the upper face of the seating portion 51, and includes the leg ventilation hole 24 The leg ventilation hole 24 is formed in a shape slightly curved inward in the width direction at a position adjacent to the side face of the seat 50. On the other hand, the other end of the leg duct 23 is connected to the first connection members 17 and the first ventilation openings 12, and the second connection members 18 and the second ventilation openings 13 through the conditioned air supply mechanism unit (not illustrated).

Thus, part of conditioned air controlled by the seat air conditioner 1 is supplied to the leg part of the occupant seated on the seat 50 through the leg ventilation hole 24. Since the leg ventilation hole 24 is slightly curved inward in the width direction at the position above the upper face of the seating portion 51, the seat air conditioner 1 is capable of more efficiently supplying conditioned air to the leg part such as the thigh of the occupant seated on the seat 50.

Next, the configuration of the seat 50 will be described in detail with reference to the drawings. The seat 50 is disposed for the occupant in the electric vehicle. The seat 50 includes the seating portion 51, the backrest part 52, and the seat frame 53. The seating portion 51 is a part on which the occupant is seated and includes a porous cushion part on the upper face thereof.

The backrest part 52 constitutes a part that supports the occupant seated on the seating portion 51 from the back and includes a porous cushion part on the front face thereof. The seat 50 is configured in such a manner that the relative position between the seating portion 51 and the backrest part 52 is fixed by the seat frame 53.

Figure 5:
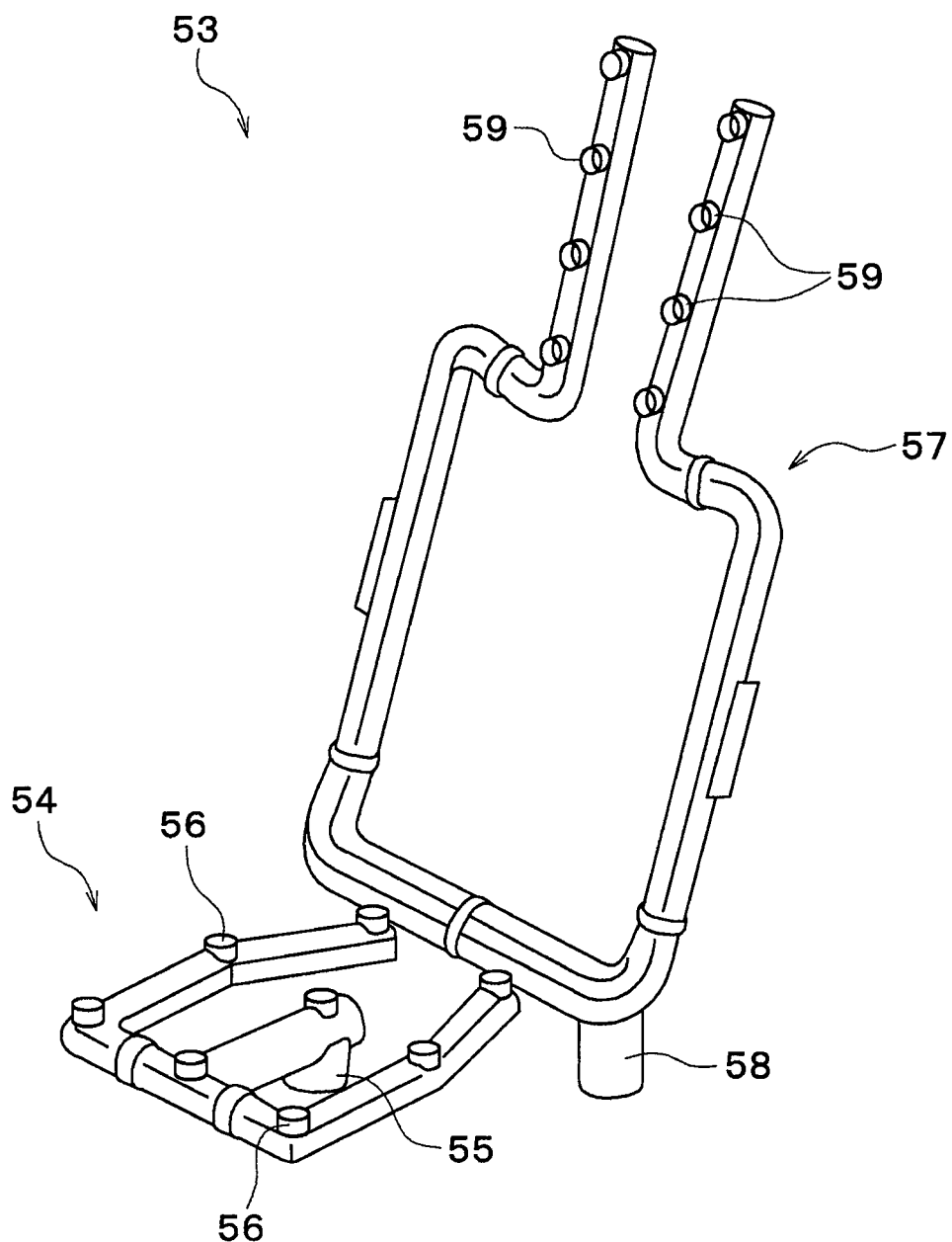
FIG. 5 is a perspective view of the appearance of a seat frame of a seat.

The seat frame 53 is configured as a combination of metal pipes. The seat frame 53 functions as a skeleton material part of the seat 50 and, at the same time, functions as a flow passage of air in the seat air conditioner 1. As illustrated in FIG. 5, the seat frame 53 includes a first seat frame 54 and the second seat frame 57. The first seat frame 54 and the second seat frame 57 are coupled together through a reinforcing member (not illustrated), and the relative positional relationship between the first seat frame 54 and the second seat frame 57 is maintained.

The first seat frame 54 is disposed below the cushion part of the seating portion 51 inside the seating portion 51. The first seat frame 54 includes a connector 55 and a plurality of vent holes 56. The connector 55 is formed on the end of the first seat frame 54, and projects from the lower face of the seating portion 51. The end of the central connection member 16 is connected to the connector 55.

The vent holes 56 are disposed at a plurality of positions on the upper face of the first seat frame 54 and communicate with the inside of the first seat frame 54 having a hollow shape. Thus, the seat air conditioner 1 according to the first embodiment is capable of drawing air above the seating portion 51 into the housing 10 through the cushion part of the seating portion 51, the first seat frame 54, the central connection member 16, and the central ventilation opening 11.

The second seat frame 57 is disposed behind the cushion part of the backrest part 52 inside the backrest part 52, and includes the conditioned air supply port 58 and a plurality of conditioned air blowoff ports 59. The conditioned air supply port 58 is disposed on the lower end of the backrest part 52 and connected to the first connection members 17 and the second connection members 18 through the conditioned air supply mechanism unit (not illustrated).

As illustrated in FIG. 5, the conditioned air blowoff ports 59 are disposed at a plurality of positions on the front face side of the second seat frame 57, and communicate with the inside of the second seat frame 57 having a hollow shape. Thus, the seat air conditioner 1 according to the first embodiment is capable of blowing conditioned air such as hot air blown through the first ventilation openings 12 and cold air blown through the second ventilation openings 13 into the cabin through the first connection members 17, the second connection members 18, the conditioned air supply mechanism unit (not illustrated), the second seat frame 57, and the cushion part of the backrest part 52.

Since the cushion parts of the seating portion 51 and the backrest part 52 are porous, it is possible to control the temperature of the cushion parts of the seating portion 51 and the backrest part 52 by an air flow created by the seat air conditioner 1.

Next, the air flow A created by the seat air conditioner 1 according to the first embodiment will be described in detail with reference to FIGS. 6 and 7. In FIGS. 6 and 7, the air flow A indicated by arrows indicates a representative air flow in the first embodiment. Thus, the air flow is not limited to this flow.

As described above, in the seat air conditioner 1 according to the first embodiment, when the air blower 7 is operated to rotate the centrifugal multi-blade fan, air is drawn along the rotation axis of the centrifugal multi-blade fan. Thus, in the seat air conditioner 1, air located above the upper face of the housing 10 is drawn into the housing 10 through the central ventilation opening 11 formed on the upper face of the housing 10.

The connector 55 of the first seat frame 54 is coupled to the central ventilation opening 11 through the central connection member 16. Further, the first seat frame 54 is disposed under the cushion part of the seating portion 51 in the seat 50, and includes the vent holes 56. Thus, the seat air conditioner 1 is capable of drawing air above the seating portion 51 into the housing 10 through the cushion part of the seating portion 51 and the first seat frame 54.

The air drawn into the housing 10 is blown in the centrifugal direction of the air blower 7 and heat-exchanged with the refrigerant in the condenser 4 and the evaporator 6. Accordingly, the air blown from the air blower 7 is heated or cooled by the condenser 4 or the evaporator 6 and blown out as conditioned air through the first ventilation openings 12 and the second ventilation openings 13.

As indicated by arrows in FIGS. 6 and 7, the air flow A of conditioned air blown to the outside of the housing 10 though the first ventilation openings 12 and the second ventilation openings 13 flows inside the main duct 21 and the leg duct 23 through the conditioned air supply mechanism unit (not illustrated). At this time, part of the conditioned air is supplied into the second seat frame 57 through the conditioned air supply mechanism unit.

Conditioned air flowing through the main duct 21 is blown forward and obliquely upward from the main ventilation holes 22 which are located on both right and left sides of the backrest part 52. The main ventilation holes 22 are bent inward in the width direction of the seat 50 on both right and left sides of the backrest part 52. Thus, the conditioned air is blown toward the trunk part of the occupant seated on the seat 50.

Conditioned air flowing through the leg duct 23 is blown forward and obliquely upward from the leg ventilation holes 24 which are located on both right and left sides of the seating portion 51. The leg ventilation holes 24 are bent inward in the width direction of the seat 50 on both right and left sides of the seating portion 51. Thus, the conditioned air is blown toward the leg part of the occupant seated on the seat 50.

On the other hand, conditioned air flowing through the second seat frame 57 is blown toward the front side of the seat 50 from each conditioned air supply port 58 formed on the second seat frame 57 through the cushion part of the backrest part 52.

Thus, the seat air conditioner 1 according to the first embodiment is capable of supplying conditioned air to a certain range on the front side of the seat 50. The range to which conditioned air is supplied corresponds to a range where the occupant seated on the seat 50 is located. That is, the seat air conditioner 1 makes it possible to efficiently improve the comfort of the occupant seated on the seat 50 by supplying conditioned air.

As illustrated in FIGS. 6 and 7, the certain range on the front side of the seat to which conditioned air is blown is located above the seating portion 51 of the seat 50. As described above, the seat air conditioner 1 according to the first embodiment draws air above the seating portion 51 into the housing 10 from the central ventilation opening 11 through the cushion part of the seating portion 51 by the operation of the air blower 7. Thus, the seat air conditioner 1 according to the first embodiment is capable of creating the air flow A which circulates between the seat air conditioner 1 and a space where the occupant seated on the seat 50 is present.

A case where cold air is supplied as the conditioned air in the seat air conditioner 1 according to the first embodiment will be considered. As described above, in the seat air conditioner 1, air drawn through the central ventilation opening 11 is cooled by heat exchange with the refrigerant in the evaporator 6 and blown as cold air to the outside of the housing 10 through the second ventilation openings 13.

In this case, when the temperature of air to be heat-exchanged in the evaporator 6 is high, the temperature of air after the heat exchange in the evaporator 6 also becomes high. Thus, in improving the comfort of the occupant seated on the seat 50 by supplying cold air, the temperature of air drawn through the central ventilation opening 11 is important.

As described above, in the seat air conditioner 1 according to the first embodiment, air to be heat-exchanged in the evaporator 6 is air above the seating portion 51 drawn through the central ventilation opening 11. The air above the seating portion 51 is less likely to be affected by solar radiation than air near the cabin floor surface F, and has a lower temperature than the air near the cabin floor surface F.

Thus, since the seat air conditioner 1 according to the first embodiment is capable of drawing air having a lower temperature than air near the cabin floor surface F from above the seating portion 51, it is possible to make the temperature of cold air after heat exchange in the evaporator 6 lower than that in the case where air near the cabin floor surface F is drawn and heat-exchanged in the evaporator 6 and improve the efficiency during the blowing of cold air.

It is assumed that dirt or dust is inevitably accumulated on the cabin floor surface F by the influence of gravity. In this case, if the seat air conditioner 1 is configured to draw air near the cabin floor surface F, the seat air conditioner 1 also draws dirt or dust into the housing 10 along with the drawing of air by the operation of the air blower 7.

In this case, dirt or dust drawn into the housing 10 becomes a factor in a failure of the air blower 7 or becomes a resistance to ventilation in the condenser 4 and the evaporator 6, which may reduce the efficiency of heat exchange with the refrigerant.

In this point, as illustrated in FIGS. 6 and 7, the seat air conditioner 1 according to the first embodiment is configured to draw air above the seating portion 51 through the central ventilation opening 11 formed on the upper face of the housing 10. Thus, the seat air conditioner 1 does not draw dirt or dust accumulated on the cabin floor surface F. That is, the seat air conditioner 1 makes it possible to prevent a reduction in air conditioning performance of the refrigeration cycle caused by dust or the like drawn into the housing 10 and prevent a failure caused by dust or the like.

Further, as illustrated in FIGS. 6 and 7, the seat air conditioner 1 according to the first embodiment is capable of creating the air flow A which circulates between the seat air conditioner 1 and the space where the occupant seated on the seat 50 is present. According to the circulating air flow A, part of cold air blown to the space where the occupant seated on the seat 50 is present is drawn into the housing 10 of the seat air conditioner 1 through the cushion part of the seating portion 51 and the central ventilation opening 11.

Accordingly, in the seat air conditioner 1, at least part of the air blown as cold air can be used as air to be heat-exchanged in the evaporator 6. That is, the seat air conditioner 1 makes it possible to lower the temperature of air to be heat-exchanged in the evaporator 6 and improve the air conditioning performance during the blowing of cold air.

As described above, in the seat air conditioner 1 according to the first embodiment, the refrigeration cycle 2 and the air blower 7 are housed inside the housing 10 which is disposed in the space between the seating portion 51 of the seat 50 and the cabin floor surface F. The seat air conditioner 1 controls the temperature of air blown by the air blower 7 by the refrigeration cycle 2 and blows the temperature-controlled air to improve the comfort of the occupant seated on the seat 50.

In the seat air conditioner 1 according to the first embodiment, air blown as conditioned air by the refrigeration cycle 2 is generated using air drawn through the central ventilation opening 11 formed on the upper face of the housing 10. The central ventilation opening 11 is formed on the upper face of the housing 10 and thus configured to draw air above the upper face of the housing 10.

Thus, the seat air conditioner 1 according to the first embodiment is capable of performing air conditioning by the refrigeration cycle 2 using not air near the cabin floor surface F which is apt to be affected by solar radiation, but air above the upper face of the housing 10. Thus, it is possible to improve the air conditioning performance in the seat air conditioner 1.

In the configuration that draws air near the cabin floor surface F into the housing 10, dirt or dust accumulated on the cabin floor surface F may also be drawn. In this point, according to the seat air conditioner 1, air is drawn through the central ventilation opening 11 formed on the upper face of the housing 10. Thus, it is possible to reduce the drawing of dirt or dust as compared to the case where air near the cabin floor surface F is drawn. Accordingly, the seat air conditioner 1 makes it possible to prevent a reduction in air conditioning performance of the refrigeration cycle caused by dust or the like and also prevent a failure of the seat air conditioner 1 caused by dust or the like.

In the seat air conditioner 1, the central connection member 16 is attached to the central ventilation opening 11, and the central connection member 16 is connected to the connector 55 of the first seat frame 54 which is disposed inside the seating portion 51 of the seat 50. The first seat frame 54 is disposed under the cushion part having air permeability inside the seating portion 51 and includes the vent holes 56.

Thus, when the seat air conditioner 1 draws air through the central ventilation opening 11 by the operation of the air blower 7, air above the seating portion 51 can be drawn through the central connection member 16, the first seat frame 54, and the cushion part of the seating portion 51. The air above the seating portion 51 is located above the upper face of the housing 10 and has a small influence of heat radiation relative to air near the cabin floor surface F. Thus, the air above the seating portion 51 has a lower temperature and includes less dirt or dust.

As a result, according to the seat air conditioner 1, it is possible to improve the air conditioning performance by drawing air from the central ventilation opening 11 through the seating portion 51 and prevent the occurrence of a failure and a reduction in air conditioning performance caused by dirt or dust.

In the seat air conditioner 1, the first ventilation openings 12 and the second ventilation openings 13 are formed on the upper face of the housing 10 and connected to the main duct 21 and the leg duct 23. As illustrated in FIGS. 6 and 7, each of the main ventilation hole 22 of the main duct 21 and the leg ventilation hole 24 of the leg duct 23 is disposed on the side face of the seat 50 and configured to blow conditioned air to a part where the occupant is seated on the seat 50.

Thus, the seat air conditioner 1 is capable of efficiently supplying conditioned air controlled by the refrigeration cycle 2 to the occupant seated on the seat 50 and efficiently achieving a comfortable environment.

As illustrated in FIGS. 6 and 7, in the seat air conditioner 1, conditioned air is blown to a part in front of the seat 50 through the main ventilation holes 22 of the main duct 21 and the leg ventilation holes 24 of the leg duct 23. Air on the front face of the seat 50 is drawn into the housing 10 from the central ventilation opening 11 through the cushion part of the seating portion 51 and the first seat frame 54.

That is, the seat air conditioner 1 is capable of creating the air flow A which passes through the seat air conditioner 1 and the front face of the seat 50 and circulating the air flow A. Accordingly, the seat air conditioner 1 makes it possible to improve the air conditioning performance of the seat air conditioner 1 during the supply of cold air.

The first ventilation openings 12 and the second ventilation openings 13 are connected to the second seat frame 57 through the first connection members 17 and the second connection members 18. As illustrated in FIG. 5, the second seat frame 57 includes the conditioned air blowoff ports 59, and is disposed behind the cushion part having air permeability inside the backrest part 52.

Thus, the seat air conditioner 1 is capable of supplying conditioned air controlled by the refrigeration cycle 2 through the cushion part of the backrest part 52 and providing the occupant seated on the seat 50 with a comfortable environment.

In the seat air conditioner 1, the conditioned air is blown to a part in front of the seat 50 from the conditioned air blowoff ports 59 of the second seat frame 57 through the cushion part of the backrest part 52. Air on the front face of the seat 50 is drawn into the housing 10 from the central ventilation opening 11 through the cushion part of the seating portion 51 and the first seat frame 54.

That is, the seat air conditioner 1 is capable of creating the air flow A passing through the seat air conditioner 1 and the front face of the seat 50 including the conditioned air blown through the cushion part of the backrest part 52 and circulating the air flow A. Accordingly, the seat air conditioner 1 makes it possible to improve the air conditioning performance of the seat air conditioner 1 during the supply of cold air.

Second Embodiment

Next, a second embodiment which differs from the first embodiment described above will be described with reference to the drawings. A seat air conditioner 1 according to the second embodiment is applied to air conditioning of an electric vehicle which travels by power of a battery in a manner similar to the first embodiment. In the following description, the same reference signs as those of the first embodiment designate identical elements, and the preceding description will be referred to.

Figure 8:
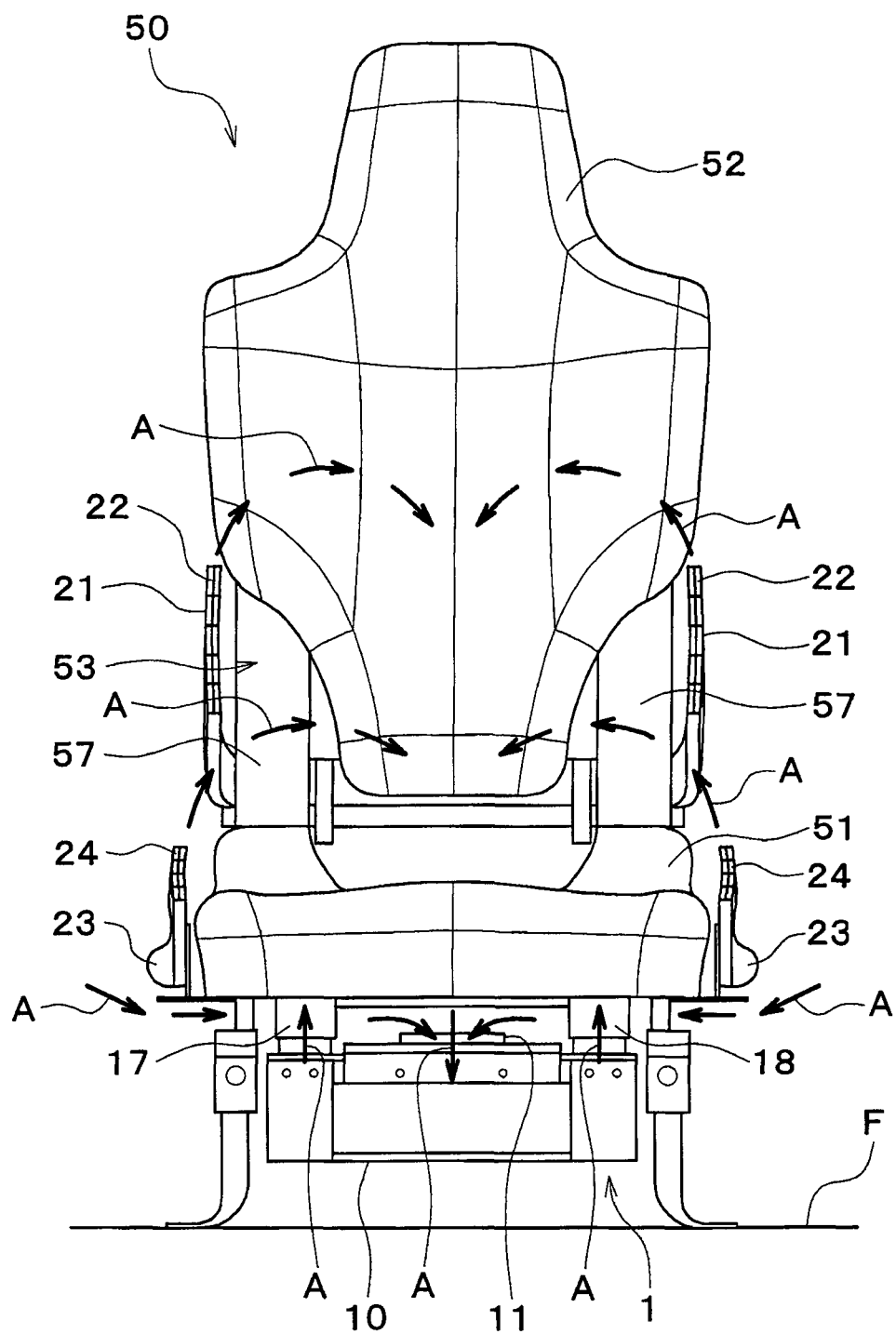
FIG. 8 is a front view illustrating an air flow created by a seat air conditioner according to a second embodiment.
Figure 9:
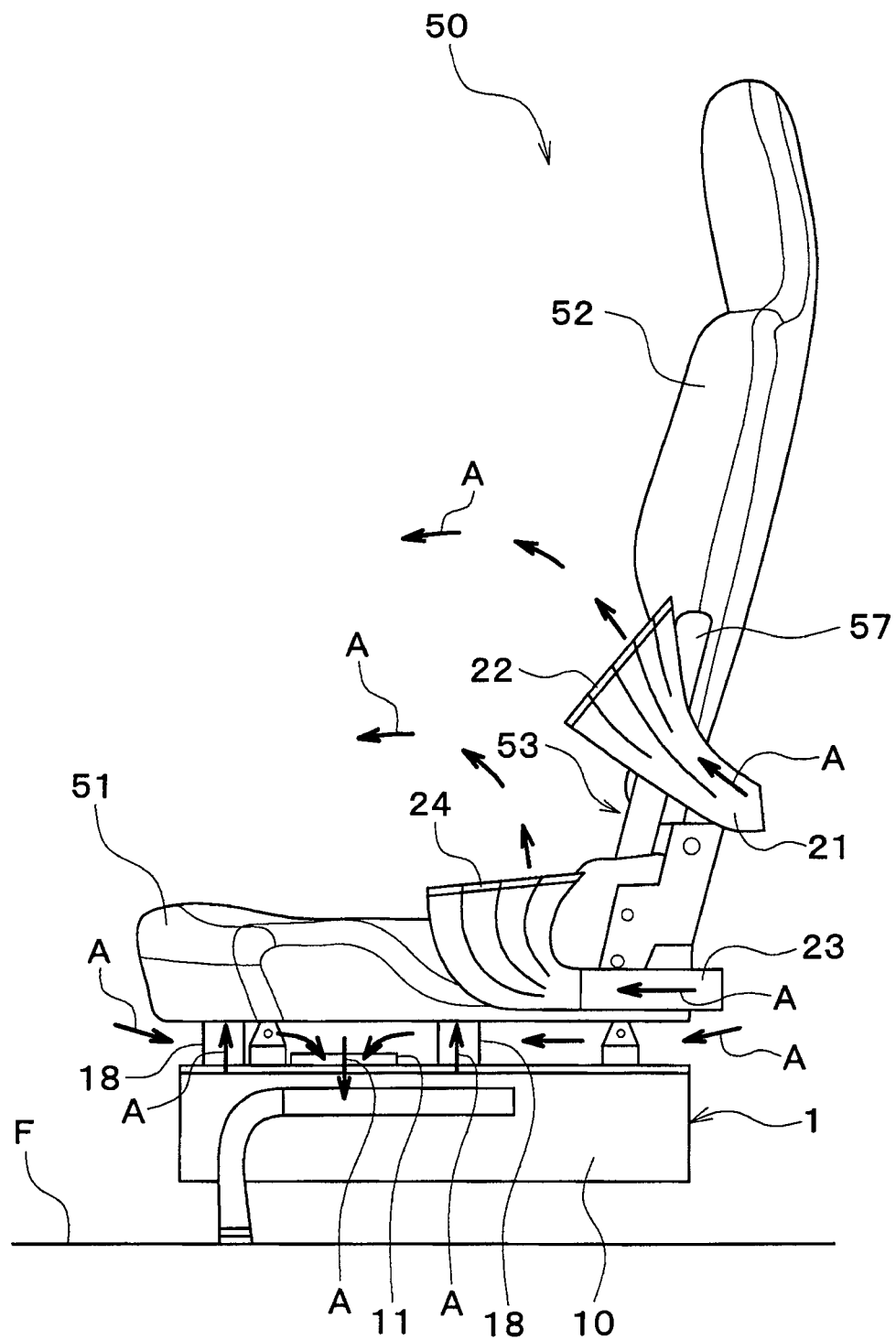
FIG. 9 is a side view illustrating the air flow created by the seat air conditioner according to the second embodiment.

As illustrated in FIGS. 8 and 9, the seat air conditioner 1 in the second embodiment is disposed in a small space between a seating portion 51 of a seat 50 of the electric vehicle and a cabin floor surface F in a manner similar to the first embodiment. The seat air conditioner 1 improves the comfort of an occupant seated on the seat 50 by creating an air flow A through the seat 50.

The seat air conditioner 1 includes a housing 10 which is formed in a box shape, and a vapor compression refrigeration cycle 2 and an air blower 7 using a centrifugal multi-blade fan which are housed inside the housing 10 in a manner similar to the first embodiment. The refrigeration cycle 2 includes a compressor 3, a condenser 4, an expansion valve 5, and an evaporator 6 which are connected through refrigerant pipes.

The layout inside the housing 10 in the seat air conditioner 1 according to the second embodiment is similar to that of the first embodiment, and the components of the refrigeration cycle 2 and the air blower 7 are housed in a layout illustrated in FIGS. 3 and 4.

A central ventilation opening 11, first ventilation openings 12, and second ventilation openings 13 are formed on the upper face of the housing 10 according to the second embodiment in a manner similar to the first embodiment. A first connection member 17 is attached to each of the first ventilation openings 12, and a second connection member 18 is attached to each of the second ventilation openings 13 in a manner similar to the first embodiment. The first connection members 17 and the second connection members 18 are connected to a main duct 21, a leg duct 23, and a second seat frame 57 through an conditioned air supply mechanism unit (not illustrated).

In the second embodiment, the central connection member 16 in the first embodiment is not connected to the central ventilation opening 11. Thus, the central ventilation opening 11 communicates with a space between the lower face of the seating portion 51 of the seat 50 and the upper face of the housing 10. Thus, in the second embodiment, air between the upper face of the housing 10 and the seating portion 51 is drawn into the housing 10 along with the operation of the air blower 7.

The configurations of the main duct 21, the leg duct 23, and the seat 50 of the second embodiment are similar to those of the first embodiment. Thus, redundant description will be omitted.

Next, the air flow A created by the seat air conditioner 1 according to the second embodiment will be described in detail with reference to FIGS. 8 and 9. Also in FIGS. 8 and 9, the air flow A indicated by arrows indicates a representative air flow in the second embodiment. Thus, the air flow is not limited to this flow.

In the seat air conditioner 1 according to the second embodiment, when the air blower 7 is operated to rotate the centrifugal multi-blade fan, air is drawn along the rotation axis of the centrifugal multi-blade fan. Thus, in the seat air conditioner 1, air present between the upper face of the housing 10 and the seating portion 51 is drawn into the housing 10 through the central ventilation opening 11 formed on the upper face of the housing 10.

The air drawn into the housing 10 is blown in the centrifugal direction of the air blower 7 and heat-exchanged with the refrigerant in the condenser 4 and the evaporator 6. Accordingly, the air blown from the air blower 7 is heated or cooled by the condenser 4 or the evaporator 6 and blown out as conditioned air through the first ventilation openings 12 and the second ventilation openings 13.

As indicated by arrows in FIGS. 8 and 9, the air flow A of conditioned air blown to the outside of the housing 10 though the first ventilation openings 12 and the second ventilation openings 13 flows inside the main duct 21 and the leg duct 23 through the conditioned air supply mechanism unit (not illustrated). At this time, part of the conditioned air is supplied into the second seat frame 57 through the conditioned air supply mechanism unit.

Conditioned air flowing through the main duct 21 is blown forward and obliquely upward from the main ventilation holes 22 which are located on both right and left sides of the backrest part 52. The main ventilation holes 22 are bent inward in the width direction of the seat 50 on both right and left sides of the backrest part 52. Thus, also in the second embodiment, the conditioned air is blown toward the trunk part of the occupant seated on the seat 50.

Further, also in the second embodiment, conditioned air flowing through the leg duct 23 is blown forward and obliquely upward from the leg ventilation holes 24 which are located on both right and left sides of the seating portion 51. The leg ventilation holes 24 are bent inward in the width direction of the seat 50 on both right and left sides of the seating portion 51. Thus, the conditioned air is blown toward the leg part of the occupant seated on the seat 50.

On the other hand, conditioned air flowing through the second seat frame 57 is blown toward the front side of the seat 50 from each conditioned air supply port 58 of the second seat frame 57 through the cushion part of the backrest part 52.

Thus, the seat air conditioner 1 according to the second embodiment is capable of supplying conditioned air to a space on the front side of the seat 50. That is, the seat air conditioner 1 makes it possible to efficiently improve the comfort of the occupant seated on the seat 50 by supplying conditioned air.

In the second embodiment, the conditioned air blown to the space on the front side of the seat 50 is not only directly supplied to the occupant seated on the seat 50, but also functions as air conditioning around the seat 50. That is, although the rate is lower than the first embodiment, the seat air conditioner 1 according to the second embodiment is capable of drawing conditioned air temperature-controlled by the refrigeration cycle 2 into the housing 10 again from the central ventilation opening 11 through the space between the upper face of the housing 10 and the seating portion 51.

Thus, in the seat air conditioner 1, part of the air blown as cold air can be used as air to be heat-exchanged in the evaporator 6 in a manner similar to the first embodiment. That is, the seat air conditioner 1 makes it possible to lower the temperature of air to be heat-exchanged in the evaporator 6 and improve the air conditioning performance during the blowing of cold air.

As described above, in the seat air conditioner 1 according to the second embodiment, the refrigeration cycle 2 and the air blower 7 are housed inside the housing 10 which is disposed in the space between the seating portion 51 of the seat 50 and the cabin floor surface F. The seat air conditioner 1 controls the temperature of air blown by the air blower 7 by the refrigeration cycle 2 and blows the temperature-controlled air to improve the comfort of the occupant seated on the seat 50.

In the seat air conditioner 1 according to the second embodiment, air blown as conditioned air by the refrigeration cycle 2 is generated using air drawn through the central ventilation opening 11 formed on the upper face of the housing 10 in a manner similar to the first embodiment. The central ventilation opening 11 is formed on the upper face of the housing 10 and thus configured to draw air above the upper face of the housing 10.

Thus, the seat air conditioner 1 according to the second embodiment is capable of performing air conditioning by the refrigeration cycle 2 using not air near the cabin floor surface F which is apt to be affected by solar radiation, but air above the upper face of the housing 10. Accordingly, the seat air conditioner 1 according to the second embodiment makes it possible to improve the air conditioning performance by limiting the location of air used for generating the conditioned air.

In the second embodiment, air between the upper face of the housing 10 and the seating portion 51 is drawn through the central ventilation opening 11. Thus, it is possible to reduce the drawing of dirt or dust as compared to the case where air near the cabin floor surface F is drawn. Accordingly, the seat air conditioner 1 makes it possible to prevent a reduction in air conditioning performance of the refrigeration cycle caused by dust or the like and also prevent a failure of the seat air conditioner 1 caused by dust or the like.

The seat air conditioner 1 according to the second embodiment is capable of efficiently supplying conditioned air controlled by the refrigeration cycle 2 to the occupant seated on the seat 50 through the main duct 21 and the leg duct 23. The seat air conditioner 1 is capable of efficiently supplying conditioned air controlled by the refrigeration cycle 2 to the occupant seated on the seat 50 through the second seat frame 57 and the cushion part of the backrest part 52 in a manner similar to the first embodiment. That is, the seat air conditioner 1 according to the second embodiment is capable of efficiently achieving a comfortable environment of the occupant seated on the seat 50 in a manner similar to the first embodiment.

In the seat air conditioner 1 according to the second embodiment, conditioned air blown through the main duct 21, the leg duct 23, and the second seat frame 57 functions as not only air conditioning for the occupant seated on the seat 50, but also air conditioning around the seat 50.

Thus, the seat air conditioner 1 according to the second embodiment is capable of drawing part of the conditioned air controlled by the refrigeration cycle 2 into the housing 10 from the central ventilation opening 11 through the space between the upper face of the housing 10 and the seating portion 51. Accordingly, the seat air conditioner 1 makes it possible to improve the air conditioning performance of the seat air conditioner 1 during the supply of cold air.

OTHER EMBODIMENT

While the embodiments of the present disclosure are described, the present disclosure is not restricted to the embodiments, and can be implemented with various modification in the range not deviating from the scope of the present disclosure. For example, the embodiments may be suitably combined with each other. Further, the embodiments can be modified as described below.

(1) In the each of the above embodiments, the central ventilation opening 11 formed on the upper face of the housing 10 is used as an opening for drawing air into the housing 10. However, the present disclosure is not limited to this mode. For example, an auxiliary ventilation opening may be formed on the side face of the housing 10 in addition to the central ventilation opening 11, and air outside the housing 10 may be drawn into the housing 10 through the auxiliary ventilation opening. In this case, it is desired that the auxiliary ventilation opening be formed on the upper part of the side face of the housing 10. The auxiliary ventilation opening is desirably formed on the above position to minimize the drawing of air and dust or the like near the cabin floor surface F into the housing 10.

(2) In each of the above embodiments, the air blower 7 is an air blower using a centrifugal multi-blade fan. However, the form of the air blower 7 is not limited thereto. For example, an axial flow air blower, a mixed flow air blower, or a once-through air blower can also be employed as the air blower 7.

(3) Further, the air flow A created along with the operation of the air blower 7 of the seat air conditioner 1 is not limited to the above air flow A as long as it is possible to achieve a mode in which air is drawn through the central ventilation opening 11 and blown to the outside of the housing 10 through the first ventilation openings 12 and the second ventilation openings 13. That is, a configuration capable of creating an air flow opposite to the air flow A in the above embodiments may also be employed.

Specifically, air may be drawn from the main duct 21 and the leg duct 23 through the first ventilation openings 12 and the second ventilation openings 13 and blown through the central ventilation opening 11. For example, the air blower 7 is changed to the axial flow air blower, and a flow straightening member is disposed on the central part of the bottom face of the housing 10. In this case, the flow straightening member has a function of converting an air flow created by the axial flow air blower between the rotation axis direction of an impeller and the horizontal direction.

When the rotation direction of the axial flow air blower is made opposite to the direction in a case where air is drawn through the central ventilation opening 11 by the above configuration, both drawing air through the central ventilation opening 11 and drawing air through the first ventilation openings 12 can be achieved.

Also in this case, the main ventilation holes 22 of the main duct 21 and the leg ventilation holes 24 of the leg duct 23 are located above the seating portion 51. Thus, it is possible to prevent the drawing of dust or the like and reduce the influence of air near the cabin floor surface F heated by solar radiation.

(4) The disposition of the main ventilation hole 22 in the main duct 21 and the disposition of the leg ventilation hole 24 in the leg duct 23 in the above embodiments are merely examples, and the present disclosure is not limited thereto. It is only required that the main ventilation hole 22 of the main duct 21 and the leg ventilation hole 24 of the leg duct 23 be located on the side face of the seat 50, and a specific disposition thereof can be appropriately changed.

(5) In the above first embodiment, when the seat air conditioner 1 draws air located above the seating portion 51 through the central ventilation opening 11, the seat air conditioner 1 draws the air through the cushion part of the seating portion 51 and the first seat frame 54. However, the present disclosure is not limited to this mode.

For example, air above the seating portion 51 and in front of the backrest part 52 may be drawn into the housing 10 from the central ventilation opening 11 through the cushion part of the backrest part 52 and the second seat frame 57. Specifically, this mode can be achieved by connecting the central connection member 16 to the second seat frame 57. Further, the air may be drawn into the housing 10 using both a flow through the first seat frame 54 and a flow through the second seat frame 57 in combination.

(6) In the above embodiments, the seat air conditioner 1 is disposed slidably together with the seat 50 in the front-rear direction of the vehicle by fixing the seat air conditioner 1 to the lower face of the seating portion 51 of the seat 50. However, the present disclosure is not limited to this mode.

For example, the housing 10 of the seat air conditioner 1 may be fixed to a predetermined position of the cabin floor surface F, and the central ventilation opening 11, the first ventilation openings 12, the second ventilation openings 13 of the housing 10 may be connected to the seat 50 side through the central connection member 16, the first connection members 17, and the second connection members 18 which are formed in flexible tubular shapes. In this case, the central connection member 16 and the like may include, for example, a flexible duct formed in a bellows shape.

What is claimed is:

1. A seat air conditioner comprising:
a housing disposed in a space formed below a seating portion of a seat and above a cabin floor surface inside a cabin;
a compressor that compresses and discharges a refrigerant;
a condenser that dissipates heat from the refrigerant discharged from the compressor;
a decompressor that decompresses the refrigerant flowing out of the condenser;
an evaporator that evaporates the refrigerant decompressed by the decompressor; and
an air blower that blows air to be heat-exchanged with the refrigerant, the compressor, wherein
the condenser, the decompressor, the evaporator, and the air blower are housed in the housing,
the air blower is capable of drawing the air through a ventilation opening formed on an upper face of the housing,
the seat air conditioner further comprising:
a ventilation port that allows an inside and an outside of the housing to communicate with each other;
a duct member through which the air flows by an operation of the air blower, the duct member having one end connected to the ventilation port; and
a connection member through which the air flows, the connection member having one end connected to the ventilation opening and the other end coupled to a lower face of the seating portion, wherein
the other end of the duct member is disposed adjacent to a side face of the seat, and
when the air blower draws air from the outside of the housing, the air blower draws the air from the ventilation opening through the seating portion and the connection member, and the air blower blows out the drawn air through the ventilation port and the duct member.

2. The seat air conditioner according to claim 1, wherein
the duct member communicates with an inside of the seat having air permeability.

3. The seat air conditioner according to claim 2, wherein the air blower draws air from the outside of the housing through the ventilation opening and blows out the drawn air through the ventilation port, the duct member, and the seat.

4. A seat air conditioner comprising:
a housing disposed in a space formed below a seating portion of a seat and above a cabin floor surface inside a cabin;
a compressor that compresses and discharges a refrigerant;
a condenser that dissipates heat from the refrigerant discharged from the compressor;
a decompressor that decompresses the refrigerant flowing out of the condenser;
an evaporator that evaporates the refrigerant decompressed by the decompressor; and
an air blower that blows air to be heat-exchanged with the refrigerant, the compressor, wherein
the condenser, the decompressor, the evaporator, and the air blower are housed in the housing,
the air blower is capable of drawing the air through a ventilation opening formed on an upper face of the housing,
the seat air conditioner further comprising:
a ventilation port that allows an inside and an outside of the housing to communicate with each other;
a tubular member through which the air flows by an operation of the air blower, the tubular member having one end indirectly connected to the ventilation port;
a connection member through which the air flows, the connection member having one end connected to the ventilation opening and the other end coupled to a lower face of the seating portion, wherein
the tubular member communicates with an inside of the seat having air permeability, and when the air blower draws air from the outside of the housing, the air blower draws the air from the ventilation opening through the seating portion and the connection member, and blows out the drawn air through the ventilation port, the tubular member, and the seat.

5. A seat air conditioner comprising:
a housing disposed in a space formed below a seating portion of a seat and above a cabin floor surface inside a cabin;
a compressor that compresses and discharges a refrigerant;
a condenser that dissipates heat from the refrigerant discharged from the compressor;
a decompressor that decompresses the refrigerant flowing out of the condenser;
an evaporator that evaporates the refrigerant decompressed by the decompressor; and
an air blower that blows air to be heat-exchanged with the refrigerant, the compressor, wherein
the condenser, the decompressor, the evaporator, and the air blower are housed in the housing,
the air blower is capable of drawing the air through a ventilation opening formed on an upper face of the housing,
the seat air conditioner further comprising:
a plurality of ventilation ports that allow an inside and an outside of the housing to communicate with each other;
a plurality of duct members through which the air flows by an operation of the air blower, each of the plurality of duct members having one end connected to one of the plurality of ventilation ports; and
a central connection member through which the air flows, the central connection member having one end connected to the ventilation opening and the other end coupled to a lower face of the seating portion, wherein
the other ends of the plurality of duct members are disposed adjacent to a side face of the seat, and
when the air blower draws air from the outside of the housing, the air blower draws the air from the ventilation opening through the seating portion and the central connection member, and the air blower blows out the drawn air through the plurality of ventilation ports and the plurality of duct members.

6. The seat air conditioner according to claim 5, further comprising:
a seat frame through which the air flows by an operation of the air blower, the seat frame having an air supply port configured to indirectly connect to the plurality of ventilation ports via the plurality of duct members, wherein
the seat frame communicates with an inside of the seat having air permeability.

* * * * *